(12) United States Patent
Marshall

(10) Patent No.: US 10,813,304 B2
(45) Date of Patent: Oct. 27, 2020

(54) IRRIGATION APPARATUS AND FEEDING SYSTEM

(71) Applicant: 4D Holdings LLC, Studio City, CA (US)

(72) Inventor: Aaron Marshall, Valley Village, CA (US)

(73) Assignee: 4D Holdings LLC, Studio City, CA (US)

( * ) Notice: Subject to any disclaimer, the term of this patent is extended or adjusted under 35 U.S.C. 154(b) by 392 days.

(21) Appl. No.: 15/745,636

(22) PCT Filed: Jul. 18, 2016

(86) PCT No.: PCT/US2016/042747
§ 371 (c)(1),
(2) Date: Jan. 17, 2018

(87) PCT Pub. No.: WO2017/015194
PCT Pub. Date: Jan. 26, 2017

(65) Prior Publication Data
US 2018/0242538 A1  Aug. 30, 2018

Related U.S. Application Data

(60) Provisional application No. 62/195,128, filed on Jul. 21, 2015.

(51) Int. Cl.
*A01G 27/02* (2006.01)
*A01G 13/02* (2006.01)

(52) U.S. Cl.
CPC ......... *A01G 27/02* (2013.01); *A01G 13/0281* (2013.01)

(58) Field of Classification Search
USPC .......................... 47/48.5, 32, 32.4–32.8, 79
See application file for complete search history.

(56) References Cited

U.S. PATENT DOCUMENTS 4,067,143 A * 1/1978 Alwell ................... A01G 27/06
                                                                47/79
4,336,666 A * 6/1982 Caso .................... A01G 27/006
                                                                47/21.1

(Continued)

*Primary Examiner* — Andrea M Valenti
(74) *Attorney, Agent, or Firm* — Elizabeth Yang

(57) ABSTRACT

An irrigation apparatus and feeding system for dispersing liquid through a plant growing medium is disclosed. The apparatus includes a first and a second geometrically shaped container each having an outer wall with an inner surface, an open top, and a base portion configured to cover the plant growing medium. Second container is configured to be positioned within first container such that base portion of second container sets atop base portion of first container and is secured therein from an open position to a closed position thereby forming a single unit. Each base portion is configured with a plurality of elongated holes for receiving liquid therethrough such that holes of first and second container are offset from one another for blocking light from penetrating therethrough when second container is secured within first container in closed position. First and second container are configured with at least one center opening therethrough having an inner wall for receiving a plant such that center opening has at least one longitudinal opening extending therefrom to outer wall to allow placement of first and second container on the plant or to allow removal of first and second container from the plant.

23 Claims, 8 Drawing Sheets

(56) References Cited

U.S. PATENT DOCUMENTS

| | | | | |
|---|---|---|---|---|
| 4,502,244 | A * | 3/1985 | Yoham | A01G 13/0281 47/32 |
| 4,655,363 | A * | 4/1987 | Neat | B65D 41/34 215/252 |
| 5,097,626 | A * | 3/1992 | Mordoch | A01G 27/04 47/48.5 |
| 5,212,905 | A * | 5/1993 | Philoctete | A01G 25/00 47/21.1 |
| 6,601,339 | B1 * | 8/2003 | Parker | A01G 13/0281 47/48.5 |
| 7,087,938 | B2 * | 8/2006 | Streibl | H01L 27/0259 257/173 |
| 7,958,670 | B2 * | 6/2011 | Kamau | A01G 9/02 47/66.1 |
| 8,118,917 | B2 * | 2/2012 | Hoff | A01G 13/0243 95/267 |
| 8,381,436 | B2 * | 2/2013 | Harley | A01G 25/00 47/30 |
| 2003/0140557 | A1 * | 7/2003 | Lyon | A01G 27/02 47/79 |
| 2006/0064929 | A1 * | 3/2006 | Allen | A01G 29/00 47/48.5 |
| 2008/0256855 | A1 * | 10/2008 | Helmy | A01G 13/0281 47/33 |
| 2010/0212222 | A1 * | 8/2010 | Gallo | A01G 13/0281 47/17 |
| 2011/0120000 | A1 * | 5/2011 | Ogilvie | A01G 9/124 47/31.1 |
| 2012/0083929 | A1 * | 4/2012 | Conrad, Jr. | A01G 27/00 700/284 |
| 2012/0159843 | A1 * | 6/2012 | Whitcomb | A01G 13/0281 47/21.1 |
| 2012/0266533 | A1 * | 10/2012 | Hoff | A01G 29/00 47/21.1 |
| 2013/0067810 | A1 * | 3/2013 | Kamau | A01G 9/022 47/66.6 |
| 2015/0282441 | A1 * | 10/2015 | Marshall | A01G 27/00 47/79 |
| 2015/0282443 | A1 * | 10/2015 | Marshall | A01G 27/00 47/79 |
| 2016/0374277 | A1 * | 12/2016 | Lortscher | B32B 5/26 47/48.5 |

* cited by examiner

IRRIGATION APPARATUS AND FEEDING SYSTEM

TECHNICAL FIELD

The present invention relates to the field of horticultural irrigation apparatus and watering systems, and more particularly, to a disposable or reusable irrigation apparatus and system for feeding or watering plants and the like.

BACKGROUND

Plants typically require feeding or watering or otherwise supplementing with liquid nutrition at least once weekly to survive. During occasions when an individual plans to be away from home for an extended period of time, the individual needs to make arrangements for the care of his or her plants. This involves the cost and inconvenience of hiring help to care for the plants and compromises the individual's privacy in the home or personal space.

Various self-watering plant watering or feeding apparatus and systems have been developed, but such apparatus and systems are not specifically designed for simple, convenient, and economical use due to their complex construction, and are not easily adaptable to an existing plant container or medium. It would thus be desirable to have an improved self-watering irrigation apparatus and system for feeding or watering plants and the like, which avoids the disadvantages of the known apparatus and systems.

SUMMARY

In a first aspect, there is provided herein an irrigation apparatus for dispersing liquid through a plant growing medium. The apparatus includes a first and a second geometrically shaped container of variable size each having an outer wall with an inner surface, an open top, and a base portion configured to cover the plant growing medium. The second container is configured to be positioned within the first container such that the base portion of the second container sets atop the base portion of the first container and is secured therein from an open position to a closed position thereby forming a single unit. Each base portion is configured with a plurality of elongated holes for receiving liquid therethrough such that the holes of the first container and the second container are offset from one another for blocking light from penetrating therethrough when the second container is secured within the first container in the closed position. The first container and the second container are configured with at least one center opening therethrough having an inner wall for receiving a plant. Each at least one center opening has at least one longitudinal opening extending therefrom to the outer wall to allow placement of the first container and the second container on the plant or to allow removal of the first container and the second container from the plant.

In certain embodiments, the first container is configured with a plurality of geometrically shaped stakes of variable size extending therefrom the base portion for providing stability for the apparatus to be secured in the plant growing medium.

In certain embodiments, the plurality of stakes extending therefrom the base portion of the first container are configured with a hole therethrough to serve as a drain for liquid to be directed into the plant growing medium.

In certain embodiments, the first container and the second container are connected to each other via a longitudinal connecting piece disposed at adjacent sides to each other so that the apparatus can be molded from a single sheet of material.

In certain embodiments, the second container is configured to fold over into the first container in the closed position when the first and second containers are connected to each other by the longitudinal connecting piece.

In certain embodiments, the first container and the second container are fabricated as two separate pieces.

In certain embodiments, the apparatus can be fabricated to scale any size or shape plant growing medium.

In certain embodiments, the apparatus is vacuum formed or thermoformed using any suitable plastic material.

In certain embodiments, the apparatus is configured to be disposable after one or more uses or reusable after several prior uses.

In certain embodiments, the plurality of holes can be fabricated in any suitable size or shape to allow air and liquid to the plant growing medium.

In certain embodiments, the plurality of holes are configured to receive air, water, and nutrients.

In certain embodiments, the at least one center opening having an inner wall for receiving a plant of the first container and the second container is configured to be shorter in height than the outer wall of the first container and the second container to allow any excess liquid to be delivered directly to the plant growing medium.

In certain embodiments, the inner wall of the at least one center opening of the first container is configured to have a plurality of raised indentations therethrough to allow for movement of air in between the unit and the plant growing medium.

In certain embodiments, the second container is configured with an overhang lip portion formed around a top edge of the outer wall and is set atop a top edge of the outer wall of the first container when the unit is in the closed position.

In certain embodiments, the first container and the second container are configured to be snapped into each other at a top edge of the outer wall of each container for additional security.

In certain embodiments, the base portion of the first container is configured with a plurality of geometrically shaped pieces extending therefrom to allow space between the unit and the plant growing medium and to provide stability of the unit atop the plant growing medium.

In certain embodiments, the first container is configured with a step portion formed therearound a bottom edge of the first container to allow the unit to set atop the plant growing medium and securely flush thereto to provide stability to the unit.

In certain embodiments, the step portion entraps liquid so that the liquid can be directed into the plant growing medium.

In certain embodiments, the second container is configured to include at least one raised cylinder with a hole formed therethrough extending from inside the base portion for receiving a hose and allowing use of the unit along with an automated irrigation system.

In certain embodiments, the at least one longitudinal opening extending therefrom the at least one center opening to the outer wall of the first container and the second container is configured to include at least one hole for receiving a hose so that liquid can be dispersed in between the first container and the second container when the unit is in the closed position.

In certain embodiments, the unit is configured to include a separation between the first container and the second container in the closed position to allow for air and liquid to be received into and onto the plant growing medium.

In a second aspect, there is provided herein an irrigation feeding system for dispersing liquid through a plant growing medium using the irrigation apparatus disclosed herein such that the second container is configured to include at least one raised cylinder with a hole formed therethrough extending from inside the base portion for receiving a hose and allowing use of the unit along with an automated irrigation system.

In certain embodiments, the at least one longitudinal opening extending therefrom the at least one center opening to the outer wall of the first container and the second container is configured to include at least one hole for receiving a hose so that liquid can be dispersed in between the first container and the second container when the unit is in the closed position.

Various advantages of this disclosure will become apparent to those skilled in the art from the following detailed description, when read in light of the accompanying drawings.

DETAILED DESCRIPTION

Figure 1:
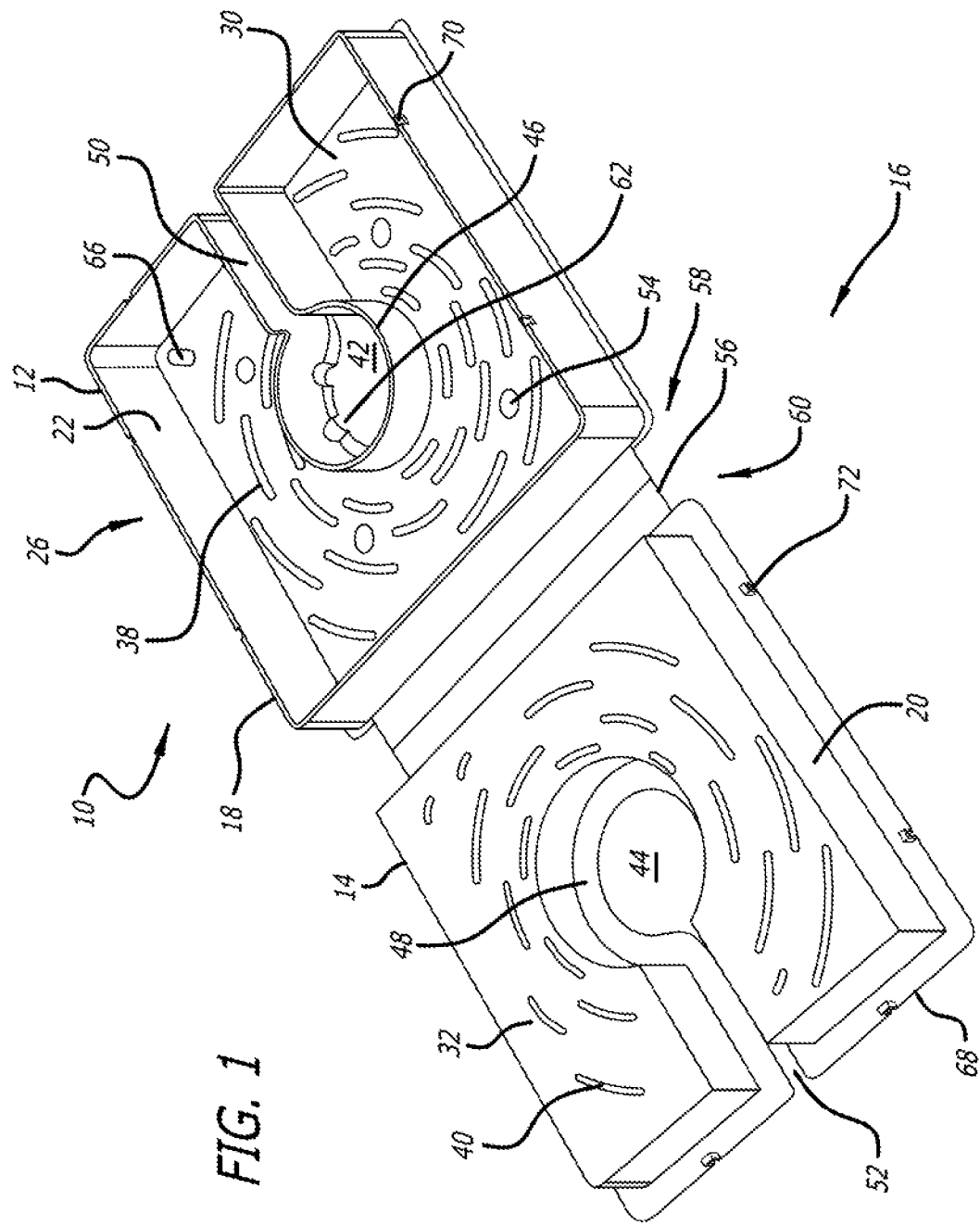
FIG. 1 is a perspective view of an exemplary embodiment of the irrigation apparatus showing the first container connected to the second container (shown upside down) in an open position according to the present disclosure.

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the disclosure is not limited to structures having the specific sizes or dimensions recited below. As used herein, the term "comprising" means "including, but not limited to."

In consideration of the figures, it is to be understood for purposes of clarity certain details of construction and/or operation are not provided in view of such details being conventional and well within the skill of the art upon disclosure of the document described herein.

The following terms and phrases shall have, for purposes of this application, the respective meanings set forth below:

The terms "feeding" and "watering" are used interchangeably herein and are intended to have the same meaning with respect to the treating of a plant with liquid nutrition so that the plant may grow and flourish.

The term "irrigation" refers to the application of water to soil or another medium by artificial means to foster plant growth.

The terms "growing medium," "medium," or "media" refer to a liquid or solid in which organic structures such as plants are placed to grow.

The term "liquid" refers to any form of liquid nutrition for a plant, including water and the like.

The term "Rockwool" refers to the inorganic mineral based horticultural grade Rockwool primarily sold as a hydroponic substrate in the horticultural industry.

The phrase "substrate growing system" is a hydroponic system in which the root zone is physically supported by media and the plants are fed by applying nutrient solution to the media.

The terms "irrigation apparatus" and "unit" are used interchangeably herein.

The irrigation apparatus and feeding system of the present disclosure pertains to a self-watering irrigation apparatus and feeding system that provides for an even and thorough distribution of water or other liquid nutrition onto a plant; prevents algae, mold, and weeds from growing in the plant growing medium by covering the medium in its entirety; low cost to manufacture; fabricated from inexpensive materials; provides a compact design for packing and shipping; durable; easy to assemble; and disposable or reusable, among other desirable features as described herein.

It is contemplated by the present disclosure that the irrigation apparatus and irrigation feeding system may be used with any suitable plant growing medium (e.g., Rockwool, soil, and the like) in a substrate growing system.

Figure 2:
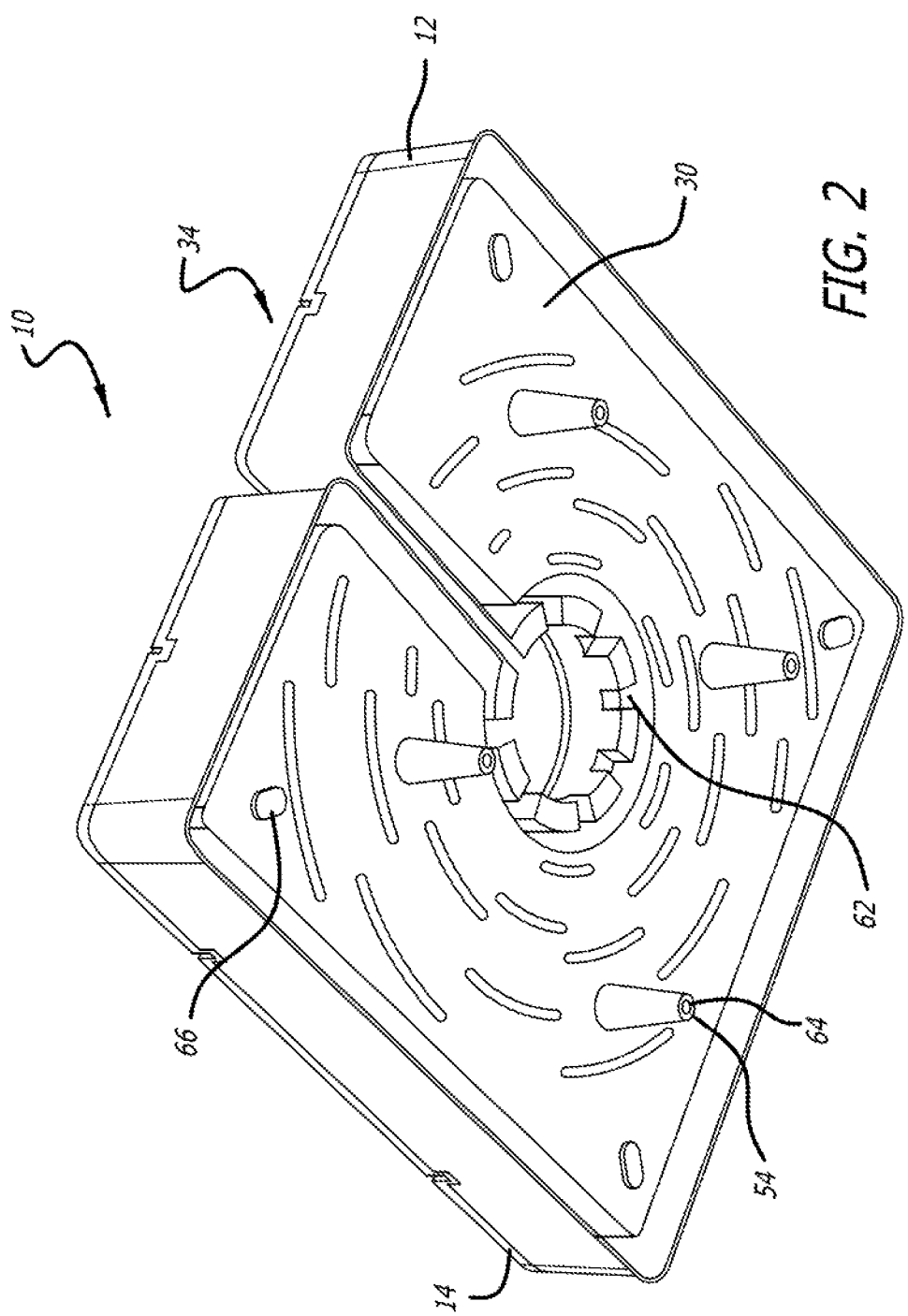
FIG. 2 is a bottom perspective view of the irrigation apparatus of FIG. 1 according to the present disclosure.
Figure 3:
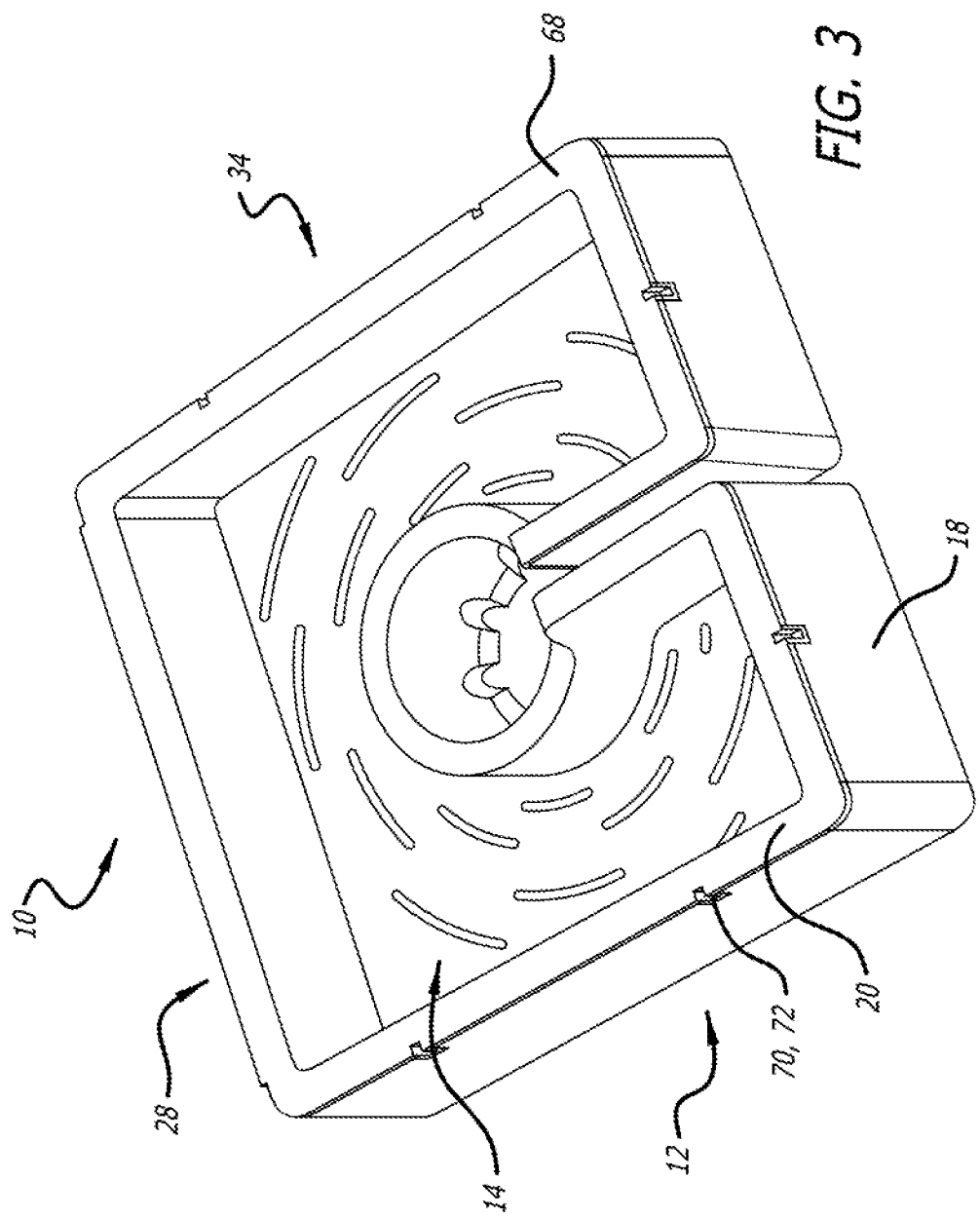
FIG. 3 is a top perspective view of the irrigation apparatus of FIG. 1 showing the second container secured within the first container in a closed position according to the present disclosure.
Figure 4:
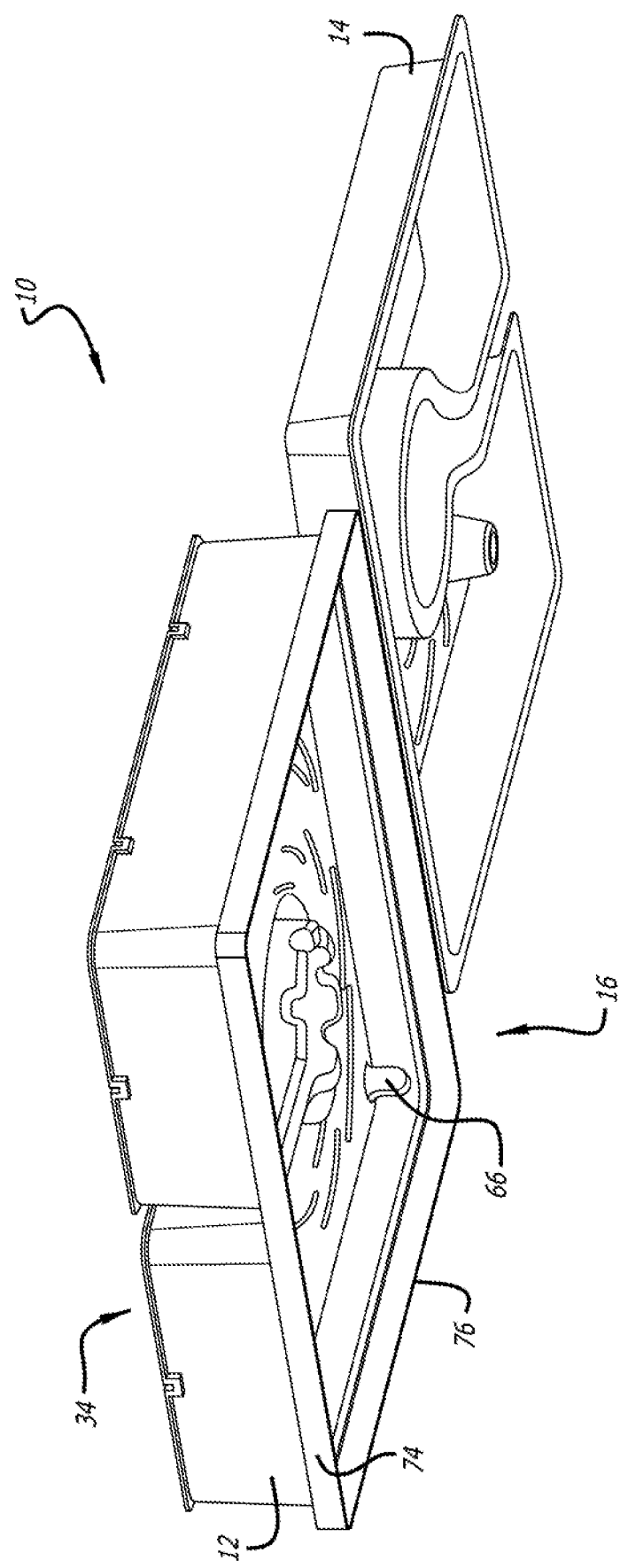
FIG. 4 is a side perspective view of the irrigation apparatus of FIG. 1 showing the first container and the second container in both the open and closed positions according to the present disclosure.
Figure 8:
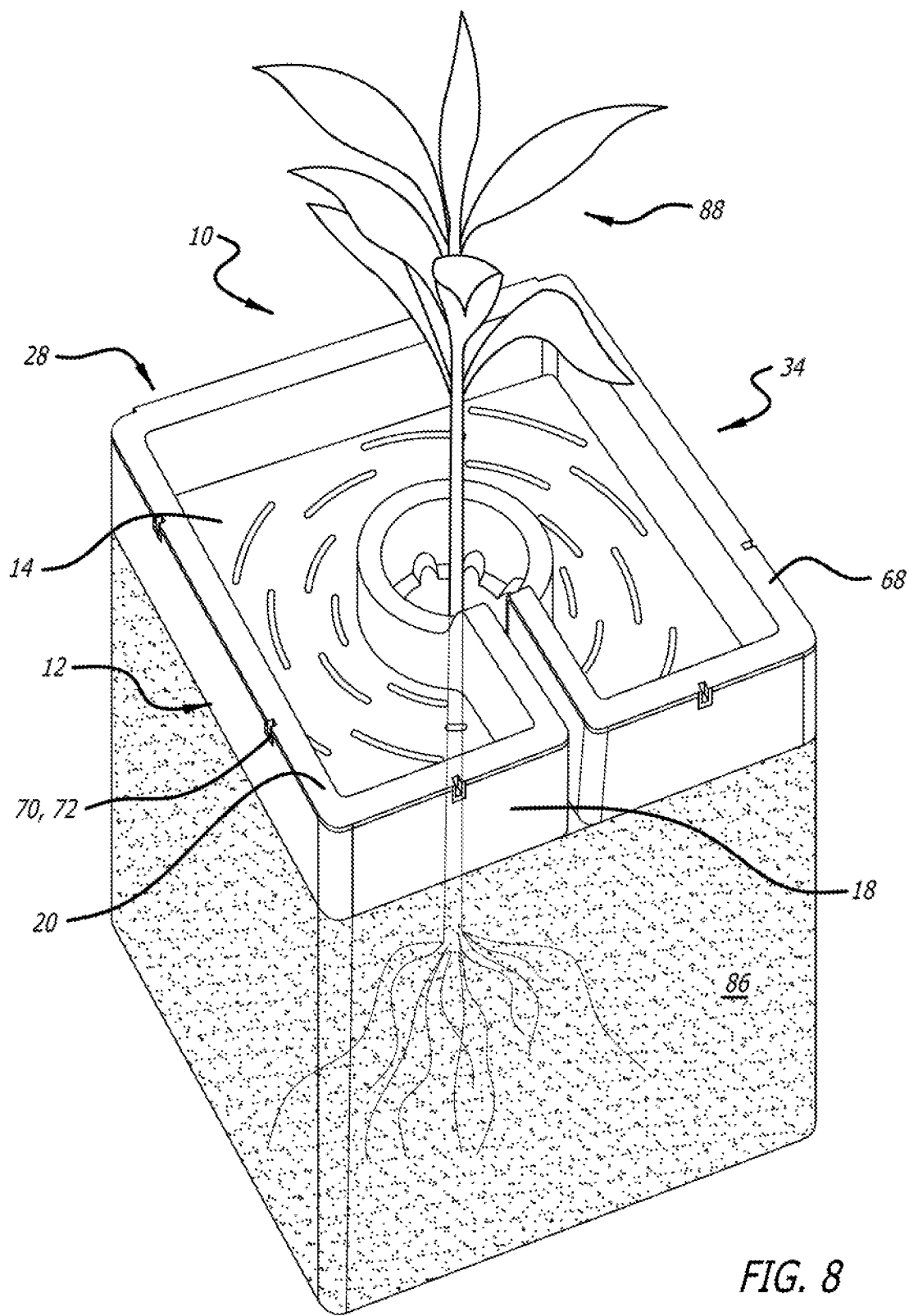
FIG. 8 is a front perspective view of the irrigation apparatus of FIG. 3 showing the apparatus secured around a plant and positioned onto plant growing medium.

Referring now to FIG. 1 is a perspective view of an exemplary embodiment of the irrigation apparatus 10 showing a first container 12 connected to a second container 14 (shown upside down) in an open position 16 according to the present disclosure. The irrigation apparatus 10 includes a first and a second geometrically shaped container 12, 14 of variable size each having an outer wall 18, 20 with an inner surface 22, 24, an open top 26, 28 (FIG. 3), and a base portion 30, 32 configured to cover plant growing medium 86 (FIG. 8). The second container 14 is configured to be positioned within the first container 12 such that the base portion 32 of the second container 14 sets atop the base portion 30 of the first container 12 and is secured therein from an open position 16 to a closed position 34 thereby forming a single unit 10. Each base portion 30, 32 is configured with a plurality of elongated holes 38, 40 for receiving liquid therethrough such that the holes 38, 40 of the first and second container 12, 14 are offset from one another for blocking light from penetrating therethrough when the second container 14 is secured within the first container 12 in the closed position 34 (FIGS. 2-4). By covering the plant growing medium 86 from light, the irrigation apparatus 10 prevents algae, mold, and weeds from growing in the plant growing medium 86.

Each container 12, 14 is configured with at least one center opening 42, 44 therethrough having an inner wall 46, 48 for receiving a plant 88 (FIG. 8). Each at least one center opening 42, 44 has at least one longitudinal opening 50, 52 extending therefrom to the outer wall 18, 20 to allow placement of the first container 12 and the second container 14 on the plant 88 or to allow removal of the first container 12 and the second container 14 from the plant 88. In accordance with the present disclosure, the at least one center opening 44 with at least one longitudinal opening 52 of the second container 14 is configured to be slightly wider in order to encase or otherwise fit around the at least one center opening 42 with at least one longitudinal opening 50 of the first container 12 in the closed position 34. It should be understood that the at least one center opening 42, 44 can be configured of any suitable size and is sized to scale relative to the size of the first container 12 and the second container 14.

In some embodiments, the first container 12 is configured with a plurality of geometrically shaped stakes 54 of variable size extending therefrom the base portion 30 for providing stability for the apparatus 10 to be secured in the plant growing medium 86. It should be understood that the plurality of geometrically shaped stakes 54 can be configured of any suitable size and shape and are sized to scale relative to the size of the first container 12 and the second container 14.

In one embodiment, the first container 12 and the second container 14 may be connected to each other by a longitudinal connecting piece 56 at adjacent sides 58, 60 to each other so that the apparatus 10 can be molded from a single sheet of material. The second container 14 is configured to fold over into the first container 12 in the closed position 34 when the first container 12 and the second container 14 are connected to each other by the longitudinal connecting piece 56. The connecting piece 56 can be fabricated from any suitable flexible material, or alternatively, can be fabricated from any suitable sturdy material and hinged.

In another embodiment, the first container 12 and the second container 14 can be fabricated as two separate pieces.

It should be understood that the irrigation apparatus 10 can be fabricated to scale any size or shape plant growing medium and fabricated of any opaque material suitable for blocking light.

In one embodiment, the irrigation apparatus 10 is vacuum formed or thermoformed using any suitable plastic material.

It should be understood that the irrigation apparatus 10 can be fabricated of any sturdy material capable of retaining liquids or fluids (e.g., water), including metal, plastic, and the like.

It should be further understood that the amount of volume the unit 10 can hold will be according to scale such that a plant growing in a 4 inches×4 inches×4 inches Rockwool cube does not require the same amount of liquid nutrition as a plant in a five gallon pot.

In some embodiments, the irrigation apparatus 10 is configured to be disposable after one or more uses or reusable after several prior uses.

It should be understood that the plurality of holes 38, 40 can be fabricated in any suitable size or shape to allow air and liquid to the plant growing medium. The plurality of holes 38, 40 are configured to receive air, water, and nutrients (not shown).

In accordance with the present disclosure, the at least one center opening 42, 44 having an inner wall 46, 48 for receiving a plant of the first container 12 and the second container 14 is configured to be shorter in height than the outer wall 18, 20 of the first container 12 and the second container 14 to allow any excess liquid to be delivered directly to the plant growing medium 86.

FIG. 2 is a bottom perspective view of the irrigation apparatus of FIG. 1 according to the present disclosure. As shown in FIG. 2, the inner wall 46 of the at least one center opening 42 of the first container 12 is configured to have a plurality of raised indentations 62 therethrough to allow space 63 (FIG. 6) for movement of air in between the unit 10 and the plant growing medium 86 (FIG. 8).

In one embodiment, the plurality of stakes 54 extending therefrom the base portion 30 of the first container 12 are each configured with a hole 64 therethrough to serve as a drain for liquid to be directed into the plant growing medium.

In some embodiments, the base portion 30 of the first container 12 is configured with a plurality of geometrically shaped pieces 66 extending therefrom to allow space 67 (FIG. 6) for movement of air between the unit 10 and the plant growing medium 86 and to provide stability of the unit atop the plant growing medium 86.

FIG. 3 is a top perspective view of the irrigation apparatus 10 of FIG. 1 showing the second container 14 secured within the first container 12 in a closed position 34 according to the present disclosure. As shown in FIG. 3, the second container 14 is configured with an overhang lip portion 68 formed around a top edge 72 of the outer wall 20 and sets atop a top edge 70 of the outer wall 18 of the first container 12 when the unit 10 is in the closed position 34.

In one embodiment, the first container 12 and the second container 14 are configured to be snapped into each other at a top edge 70, 72 of the outer wall 18, 20 of each container 12, 14 for providing additional security to the unit 10.

FIG. 4 is a side perspective view of the irrigation apparatus 10 of FIG. 1 showing the first container 12 and the second container 14 in both the open and closed positions 16, 34 according to the present disclosure. As shown in FIG. 4, the first container 12 is configured with a step portion 74 formed therearound a bottom edge 76 of the first container to allow the unit 10 to set atop the plant growing medium 86 (FIG. 8) and securely flush thereto to provide stability to the unit 10. The step portion 74 entraps liquid (not shown) so that the liquid can be directed into the plant growing medium 86.

Figure 5:
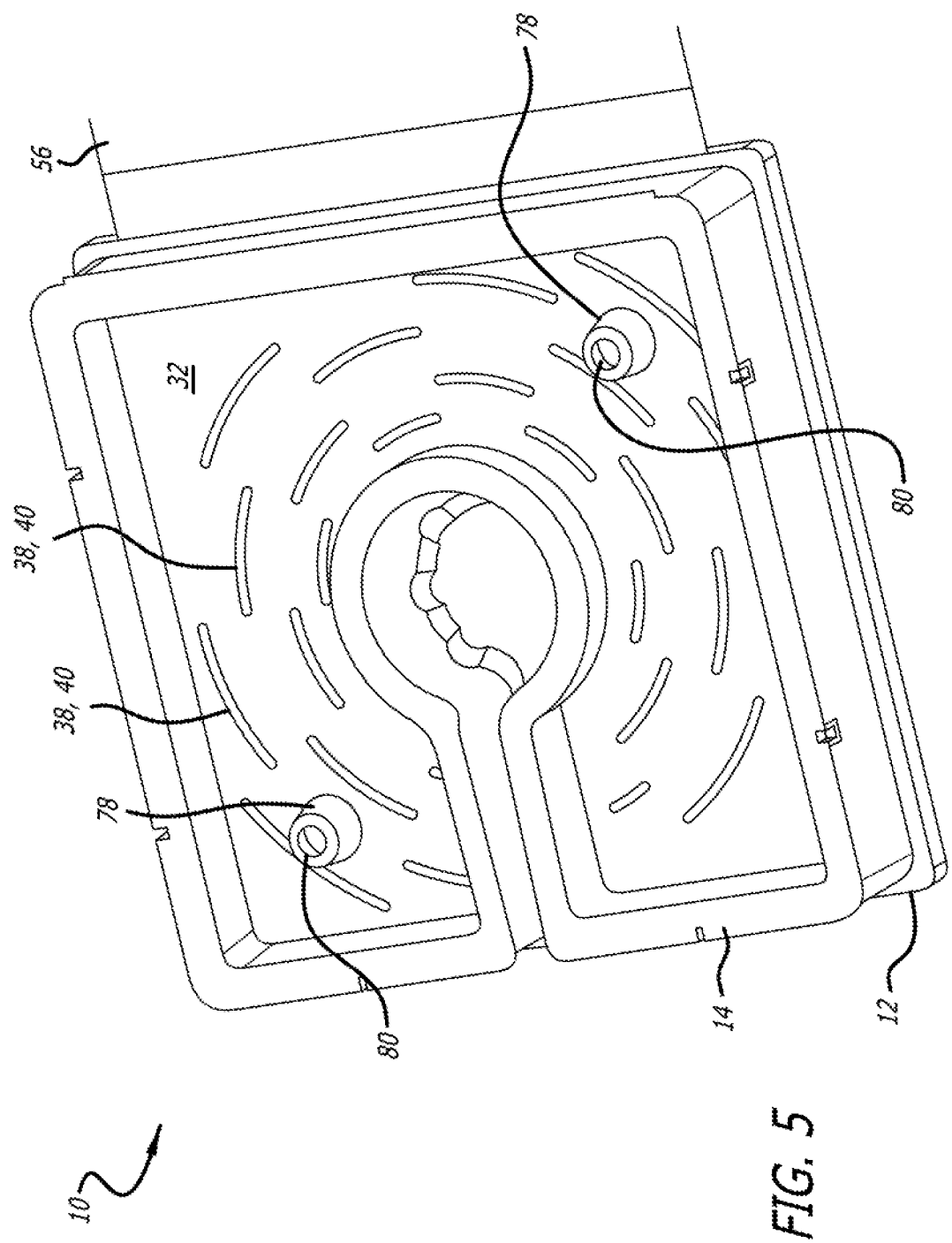
FIG. 5 is an up close, top perspective view of another exemplary embodiment of the irrigation apparatus of FIG. 1 showing the second container being positioned within the first container according to the present disclosure.

FIG. 5 is an up close, top perspective view of another exemplary embodiment of the irrigation apparatus 10 of FIG. 1 showing the second container 14 being positioned within the first container 12 according to the present disclosure. In one embodiment, the second container 14 is configured to include at least one raised cylinder 78 with a hole 80 formed therethrough extending from inside the base portion 32 for receiving a hose (not shown) and allowing use of the unit 10 along with an automated irrigation system, including, but not necessarily limited to, the types previously disclosed in co-pending, related applications, U.S. patent application Ser. Nos. 14/675,907, 14/488,009, and 14/245,731. It should be understood that the at least one raised cylinder 78 and the hose may be of any suitable size and are sized to scale relative to the size of the unit 10.

Figure 6:
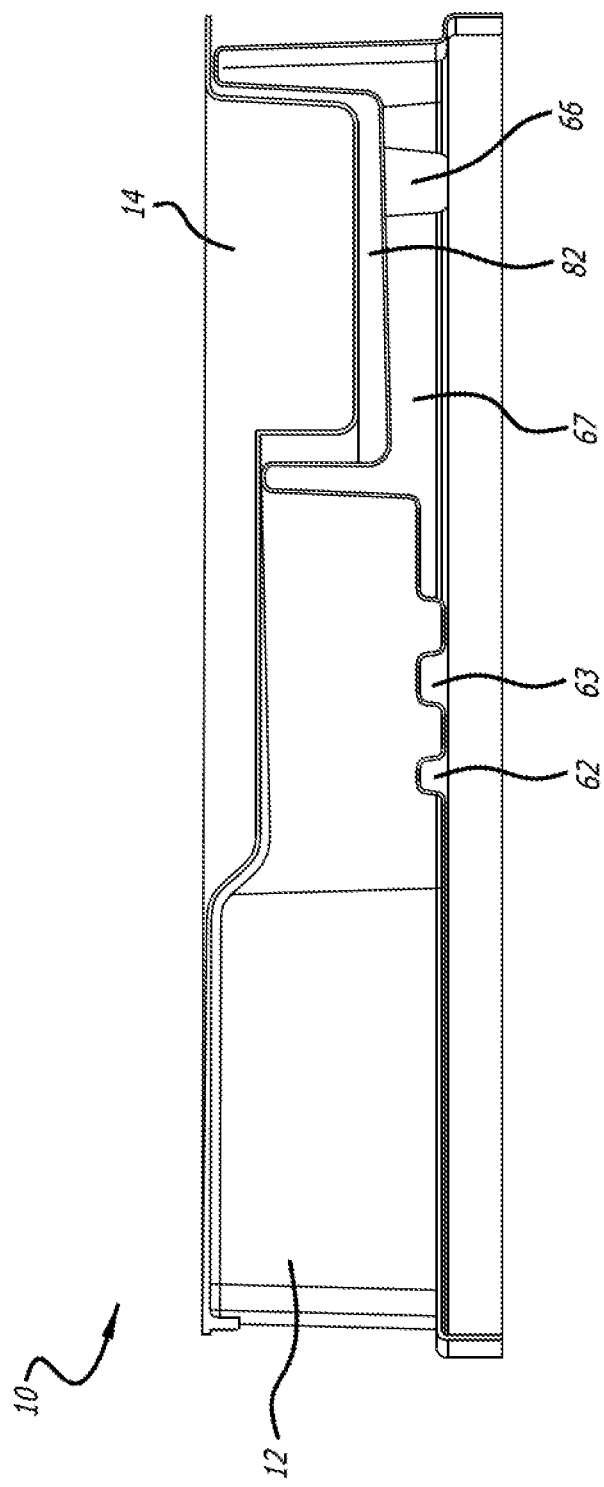
FIG. 6 is a side, cross-sectional view of the irrigation apparatus of FIG. 1 according to the present disclosure.

FIG. 6 is a side, cross-sectional view of the irrigation apparatus 10 of FIG. 1 according to the present disclosure. As shown in FIG. 6, the unit 10 is configured to include a separation 82 between the first container 12 and the second container 14 in the closed position 34 to allow for air and liquid to be received into and onto the plant growing medium.

Figure 7:
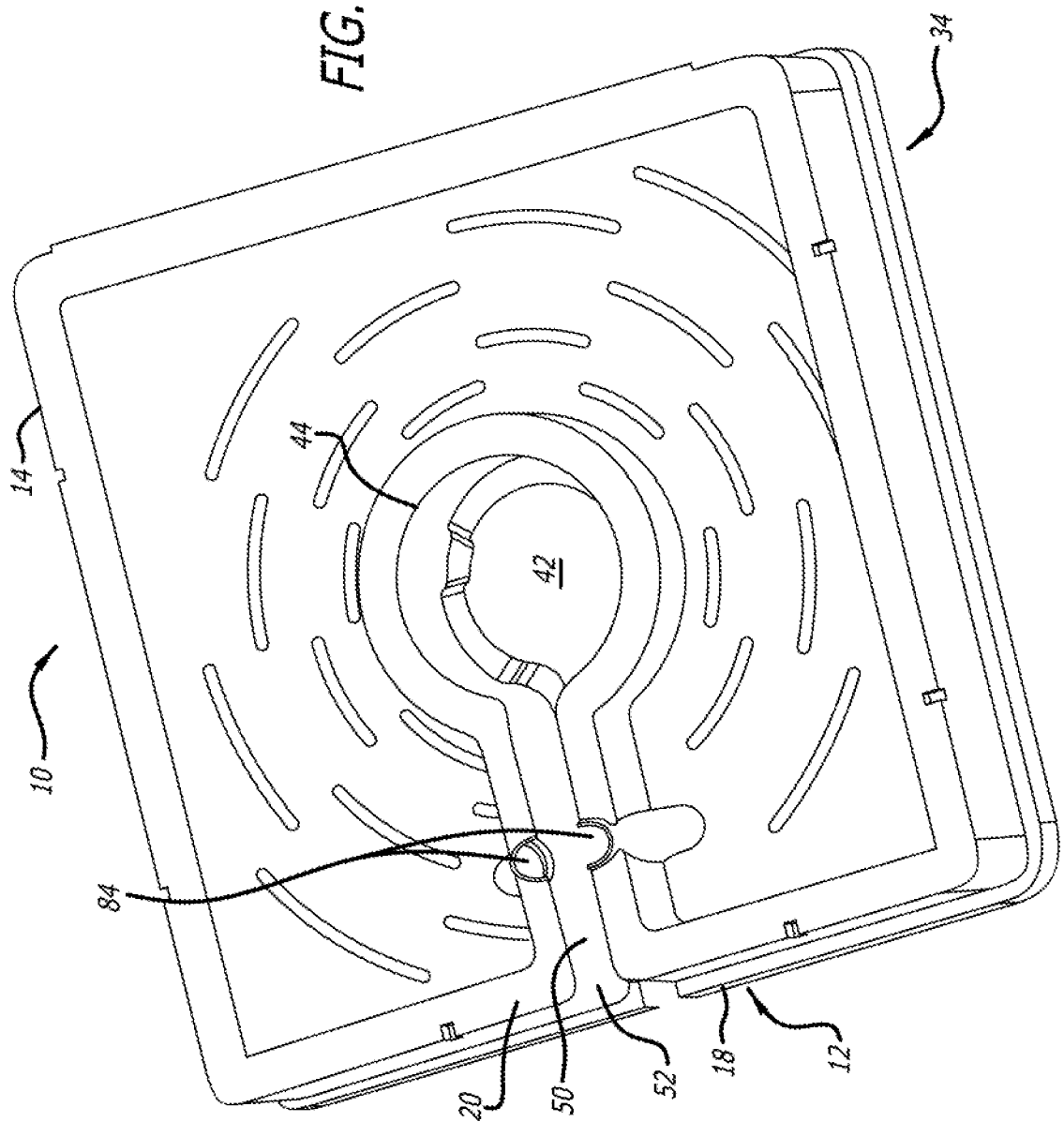
FIG. 7 is an up close, top perspective view of another exemplary embodiment of the irrigation apparatus of FIG. 1 according to the present disclosure.

FIG. 7 is an up close, top perspective view of another exemplary embodiment of the irrigation apparatus 10 of FIG. 1 according to the present disclosure. In one embodiment, the at least one longitudinal opening 50, 52 extending therefrom the at least one center opening 42, 44 to the outer wall 18, 20 of the first container 12 and the second container 14 is configured to include at least one hole 84 for receiving a hose (not shown) so that liquid can be dispersed in between the first container 12 and the second container 14 when unit 10 is in the closed position 34.

FIG. 8 is a front perspective view of the irrigation apparatus 10 showing the apparatus 10 secured around a plant 88 and positioned into and onto the plant growing medium 86.

In accordance with the present disclosure, there is also provided herein an irrigation feeding system for dispersing liquid through a plant growing medium using the irrigation apparatus 10 disclosed herein. The second container 14 is configured to include at least one raised cylinder 78 with a hole 80 formed therethrough extending from inside the base portion 32 for receiving a hose and allowing use of the unit 10 along with an automated irrigation system. It should be understood that the irrigation apparatus 10 can receive water manually poured in by the user or be used in conjunction with an automated irrigation feeding system.

In some embodiments, the at least one longitudinal opening 50, 52 extending therefrom the at least one center opening 42, 44 to the outer wall 18, 20 of the first container 12 and the second container 14 is configured to include at least one hole 84 for receiving a hose so that liquid can be dispersed in between the first container 12 and the second container 14 when the unit 10 is in the closed position 34.

Several of the features and functions disclosed above may be combined into different systems or applications, or combinations of systems and applications. Various presently unforeseen or unanticipated alternatives, modifications, variations or improvements therein may be subsequently made by those skilled in the art, each of which is also intended to be encompassed by the present disclosure.

What is claimed is:

1. An irrigation apparatus for dispersing liquid through a plant growing medium, the irrigation apparatus comprising:
a first geometrically shaped container and a second geometrically shaped container each having an outer wall with an inner surface, an open top, and a base portion configured to cover the plant growing medium, the second container configured to be positioned within the first container such that the base portion of the second container sets atop the base portion of the first container and is secured therein from an open position to a closed position thereby forming a single unit;
each base portion having a plurality of elongated holes for receiving liquid therethrough such that the holes of the first container and the second container are offset from one another for blocking light from penetrating therethrough when the second container is secured within the first container in the closed position;
the first container and the second container are each configured with at least one center opening therethrough having an inner wall for receiving a plant, the at least one center opening having at least one longitudinal opening having a pair of longitudinal walls extending therefrom to the outer wall to allow placement of the first, container and the second container on the plant or to allow removal of the first container and the second container from the plant;
wherein the longitudinal walls of the at least one longitudinal opening of each of the first container and the second container are the same height as the outer wall height of each container respectively and recede to a lower height as they approach the at least one center opening;
wherein the at least one center opening with at least one longitudinal opening of the second container is configured to be slightly wider in order to encase or otherwise fit around the at least one center opening with at least one longitudinal opening of the first container in the closed position.

2. The irrigation apparatus of claim 1, wherein the first container is configured with a plurality of geometrically shaped stakes extending therefrom the base portion for providing stability of the apparatus to be secured in the plant growing medium.

3. The irrigation apparatus of claim 2, wherein the plurality of stakes extending therefrom the base portion of the first container are configured with a hole therethrough to serve as a drain for liquid to be directed into the plant growing medium.

4. The irrigation apparatus of claim 1, wherein the first container and the second container are connected to each other via a longitudinal connecting piece disposed at adjacent sides to each other so that the apparatus can be molded from a single sheet of material.

5. The irrigation apparatus of claim 4, wherein the second container is configured to fold over into the first container in the closed position when the first container and the second container are connected to each other by the longitudinal connecting piece.

6. The irrigation apparatus of claim 1, wherein the first container and the second container are fabricated as two separate pieces.

7. The irrigation apparatus of claim 1, wherein the apparatus can be fabricated to scale any size or shape plant growing medium.

8. The irrigation apparatus of claim 1, wherein the apparatus is vacuum formed or thermoformed using any suitable plastic material.

9. The irrigation apparatus of claim 1, wherein the apparatus is configured to be disposable after one or more uses or reusable after several prior uses.

10. The irrigation apparatus of claim 1, wherein the plurality of holes can be fabricated in any suitable size or shape to allow air and liquid to the plant growing medium.

11. The irrigation apparatus of claim 1, wherein the plurality of holes are configured to receive air, water, and nutrients.

12. The irrigation apparatus of claim 1, wherein the at least one center opening having an inner wall for receiving a plant of the first container and the second container is configured to be shorter in height than the outer wall of the first container and the second container to allow any excess liquid to be delivered directly to the plant growing medium.

13. The irrigation apparatus of claim 1, wherein the inner wall of the at least one center opening of the first container is configured to have a plurality of raised indentations therethrough to allow for movement of air in between the unit and the plant growing medium.

14. The irrigation apparatus of claim 1, wherein the second container is configured with an overhang lip portion formed around a top edge of the outer wall and is set atop a top edge of the outer wall of the first container when the unit is in the closed position.

15. The irrigation apparatus of claim 1, wherein the first container and the second container are configured to be snapped into each other at a top edge of the outer wall of each container for additional security.

16. The irrigation apparatus of claim 1, wherein the base portion of the first container is configured with a plurality of geometrically shaped pieces extending therefrom to allow space between the unit and the plant growing medium and to provide stability of the unit atop the plant growing medium.

17. The irrigation apparatus of claim 1, wherein the first container is configured with a step portion formed therearound a bottom edge of the first container to allow the unit to set atop the plant growing medium and securely flush thereto to provide stability to the unit.

18. The irrigation apparatus of claim 17, wherein the step portion entraps liquid so that the liquid can be directed into the plant growing medium.

19. The irrigation apparatus of claim 1, wherein the second container is configured to include at least one raised cylinder with a hole formed therethrough extending from inside the base portion for receiving a hose and allowing use of the unit along with an automated irrigation system.

20. The irrigation apparatus of claim 1, wherein the at least one longitudinal opening extending therefrom the at least one center opening to the outer wall of the first container and the second container is configured to include at least one hole for receiving a hose so that liquid can be dispersed in between the first container and the second container when the unit is in the closed position.

21. The irrigation apparatus of claim 1, wherein the unit is configured to include a separation between the first container and the second container in the closed position to allow for air and liquid to be received into and onto the plant growing medium, and the separation is located outside the at least one center opening and the at least one longitudinal opening.

22. An irrigation feeding system for dispersing liquid through a plant growing medium, the system comprising:
an irrigation apparatus according to claim 1, wherein the second container is configured to include at least one raised cylinder with a hole formed therethrough extending from inside the base portion for receiving a hose and allowing use of the unit along with an automated irrigation system.

23. The irrigation feeding system of claim 22, wherein the at least one longitudinal opening extending therefrom the at least one center opening to the outer wall of the first container and the second container is configured to include at least one hole for receiving a hose so that liquid can be dispersed in between the first container and the second container when the unit is in the closed position.

* * * * *